(12) United States Patent
Muqaibel

(10) Patent No.: US 11,423,771 B1
(45) Date of Patent: Aug. 23, 2022

(54) AUTOMATIC DETECTION OF RITUAL TRAVEL

(71) Applicant: KING FAHD UNIVERSITY OF PETROLEUM AND MINERALS, Dhahran (SA)

(72) Inventor: Ali Hussein Muqaibel, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 17/730,267

(22) Filed: Apr. 27, 2022

(51) Int. Cl.
*G08G 1/005* (2006.01)
*G01C 21/34* (2006.01)
*G06Q 10/04* (2012.01)
*G01S 19/01* (2010.01)

(52) U.S. Cl.
CPC ......... *G08G 1/005* (2013.01); *G01C 21/3484* (2013.01); *G01S 19/01* (2013.01); *G06Q 10/047* (2013.01)

(58) Field of Classification Search
CPC .... G08G 1/005; G01C 21/34; G01C 21/3484; G01S 19/01
See application file for complete search history.

(56) References Cited

U.S. PATENT DOCUMENTS

| | | | |
|---|---|---|---|
| 2015/0370285 A1 | 12/2015 | Almosa | |
| 2016/0072900 A1* | 3/2016 | Rahman | G01S 19/38 709/213 |
| 2016/0073224 A1 | 3/2016 | Rahman et al. | |
| 2018/0047194 A1* | 2/2018 | Shirai | G16H 10/20 |
| 2018/0218624 A1* | 8/2018 | Osseiran | G09B 5/06 |

FOREIGN PATENT DOCUMENTS

IN 2007/0159612 7/2009

OTHER PUBLICATIONS

Akbar Khan, et al., "Crowd Monitoring and Localization Using Deep Convolutional Neural Network: A Review", Applied Sciences, vol. 10, Issue 14, Jul. 11, 2020, pp. 1-17.
Khalid Majrashi, "User need and experience of Hajj mobile and ubiquitous systems: Designing for the largest religious annual gathering", Cogent Engineering, vol. 5, No. 1, May 30, 2018, pp. 1-26.
Mohamed Mohandes, "Pilgrim tracking and identification using the mobile phone", IEEE 15th International Symposium on Consumer Electronics (ISCE), Jun. 14-17, 2011, 3 pages (Abstract only).

* cited by examiner

*Primary Examiner* — Tan Q Nguyen
(74) *Attorney, Agent, or Firm* — Oblon, McClelland, Maier & Neustadt, L.L.P.

(57) ABSTRACT

A device, method, and non-transitory computer readable medium for automatic detection of ritual travel is described. The device includes a processing circuitry configured to determine a relative location and an angle of travel of a user device relative to a central landmark, a first endpoint, and a second endpoint; detect an initial lap around the central landmark based on the relative location and the angle of travel; detect a number of laps taken around the central landmark and a pace of the number of laps; detect a route of travel between the first endpoint and the second endpoint; and provide instructions for completion of ritual travel based on the number of laps taken around the central landmark and the route of travel between the first endpoint and the second endpoint.

20 Claims, 11 Drawing Sheets

AUTOMATIC DETECTION OF RITUAL TRAVEL

BACKGROUND

Technical Field

The present disclosure is directed to a device and a method for automatic detection of a ritual travel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Several rituals are prescribed in an individual's religion to be performed during offering of prayers. These rituals may recite a special way of performing prayers, chanting specific prayers, travelling a path set around a religious point (e.g., the Kaaba or Ka'aba, the most sacred site in Islam), or certain number of circumambulations. For example, during a pilgrimage of Hajj and Umrah, pilgrims are expected to perform rituals such as following a determined path set, visiting several religious and historically significant sites in a specific sequence. Similarly, Buddhists also have rituals including circumambulation and performing mediation to cultivate their minds. In Buddhist circumambulation, a pilgrim travels clockwise around a devotional object such as stupa, temple, statue, and sacred mountain. In Buddhist circumambulation, three times circumambulation is customary. It is very cumbersome for the pilgrim who is performing these rituals for a first time at a completely new location.

There are many ways to guide pilgrims about how to perform such rituals such as an audio tour, a guide, or a manual/booklet. However, these ways of guiding do not help the pilgrims to perform rituals seamlessly, instead, they add additional challenges slowing the rituals due to a need to read or listen to the manual while performing the rituals. In another arrangement, multiple signboards are placed in and around the premises of a pilgrimage (religious place) for guiding the pilgrims. However, reading and following the signboards demands a high level of attention, and missing a single signboard leads to a wrong path or movement outside of the boundary of a determined path set. At times, due to the crowd, the pilgrims tend to miss these signboards. In the pilgrimage of Hajj and Umrah where there is a large pilgrim footfall, it is required that the pilgrims should not remain stationary, however reading the manual and the signboards may cause the pilgrim to stand, at least temporarily at a place, leading to crowd formation around the signboards or random places. Usually, these signboards are written in certain languages, such as Arabic, English, Urdu, and Turkish. There are a large number of foreign pilgrims, many of whom cannot speak or have only a very limited understanding of these languages or no understanding of these languages, causing the signs boards to have a limited or no effect. In some scenarios, a lot of volunteers or staff may be helpful who offer guidance to the pilgrims in case of any confusion. However, limited knowledge of foreign languages, and requirements of the volunteers in huge numbers, act as a constraint and may further cause crowding and slowing of the movement.

Since a smartphone is portable and provides an environment that enables quick access to the Internet anytime and anywhere, it is easy for pilgrim to use various websites and mobile applications for acquiring information. However, the information provided by the websites and mobile applications are not information tailored for a particular individual, but the information is common for the public at large, and also further fails to provide real-time updates about pilgrimage. Currently, there are more than 200 mobile applications available to help pilgrims to perform holy rituals. Most of these mobile applications are simple, repetitive, and also fail to provide an effective and efficient interactive service to help the users.

Accordingly, it is one object of the present disclosure to provide a device and a method for providing interactive service to the pilgrims in an effective, efficient, and accurate manner.

SUMMARY

In an exemplary embodiment, a method for automatic detection of ritual travel using an electronic device is disclosed. The method includes determining a relative location and an angle of travel of a user device relative to a central landmark, a first endpoint, and a second endpoint using sensor data. The method further includes detecting an initial lap around the central landmark based on the relative location and the angle of travel. The method further includes detecting a number of laps taken around the central landmark and a pace of the number of laps. The method further includes detecting a route of travel between the first endpoint and the second endpoint. The method further includes providing instructions for completion of ritual travel based on the number of laps taken around the central landmark and the route of travel between the first endpoint and the second endpoint.

In another exemplary embodiment, a device for automatic detection of ritual travel is disclosed. The device system includes a processing circuitry configured to: determine a relative location and an angle of travel of a user device relative to a central landmark, a first endpoint, and a second endpoint; detect an initial lap around the central landmark based on the relative location and the angle of travel; detect a number of laps taken around the central landmark and a pace of the number of laps; detect a route of travel between the first endpoint and the second endpoint; and provide instructions for completion of ritual travel based on the number of laps taken around the central landmark and the route of travel between the first endpoint and the second endpoint.

In another exemplary embodiment, a non-transitory computer readable medium having instructions stored therein that, when executed by a computer, cause the computer to perform a method. The method includes determining a relative location and an angle of travel relative to a central landmark, a first endpoint, and a second endpoint using sensor data. The method further includes detecting an initial lap around the central landmark based on the relative location and the angle of travel. The method further includes detecting a number of laps taken around the central landmark and a pace of the number of laps. The method further includes detecting a route of travel between the first endpoint and the second endpoint. The method further includes providing instructions for completion of ritual travel based on the number of laps taken around the central landmark and the route of travel between the first endpoint and the second endpoint.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
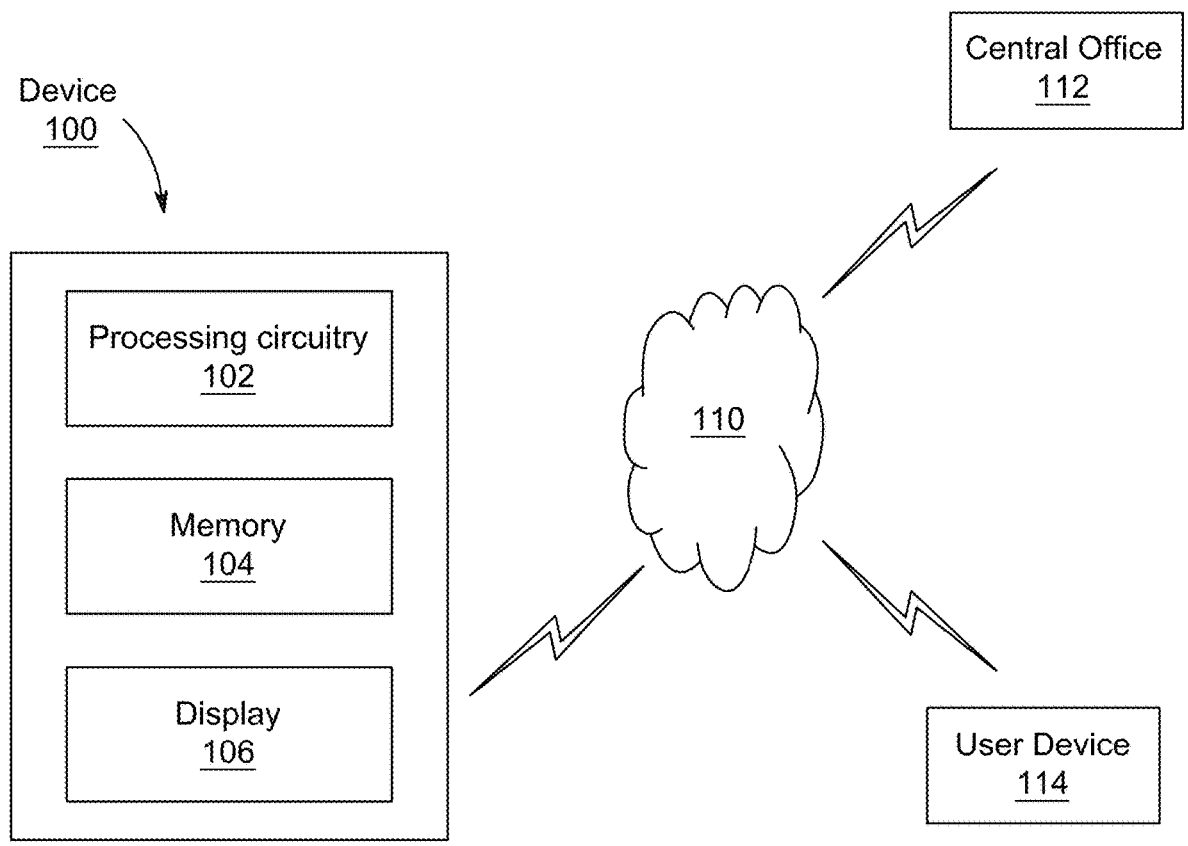
FIG. 1 illustrates a block diagram of a device for automatic detection of a ritual travel, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In an aspect of the present disclosure, the terms "user" and "pilgrim" are exchangeable. Aspects of this disclosure are directed to a device, method, and non-transitory computer readable medium method for automatic detection of ritual travel. Millions of pilgrims perform their Hajj and Umrah in Makkah, Saudi Arabia every year. Tawaf and Sa'i are among the main rituals during the Hajj. Mataf and Masa'a are the two main areas for the rituals. Tawaf is the ritual performed in the Mataf area. The Tawaf is done by circulating/encircling the Kaaba seven times in a counterclockwise course starting from Al-Hajar Al-Aswad (the Black Stone) while reciting supplications and prayers. In Masa'a, the pilgrim travels between the Safa hill and the Marwa hill seven times while reciting supplications and prayers, this ritual is called Sa'i.

The present disclosure enhances the experience of the pilgrims by performing automatic detection and analysis of Hajj and Umrah activities. The present disclosure aims to provide a real-time, interactive Umrah/Hajj rituals detection in an automated way, using smartphone/smartwatch or other wearable sensors. The present device is configured to collect the different data from a plurality of sensors and identify the various activities without direct intervention from the pilgrim. The present device also communicates useful information to the pilgrims to support them to complete the rituals successfully. During the month of Ramadan, a huge gathering of pilgrims performs their Hajj. Such massive numbers normally require proper crowd management for facilitating a pleasant experience to the pilgrims. In an aspect, the present device is commutatively coupled with a central office to share the data for taking appropriate actions in crowd management.

In various aspects of the disclosure, non-limiting definitions of one or more terms that will be used in the document are provided below.

A term "device" may refer to a communication device capable of communicating with other devices. For example, the communication device includes a near field antenna (Bluetooth), a WiFi (Wireless-Fidelity) antenna, and/or an RF antenna that can send data over 4G, etc.

FIG. 1 illustrates a block diagram of a device 100 for automatic detection of a ritual travel, according to one or more aspects of the present disclosure. As shown in FIG. 1, the device 100 is configured to communicate with at least one user device 114, and/or a central office 112 over a data communication network 110.

In an aspect, the device 100 is a special-purpose device, which is configured to provide an interactive service to a user to support ritual travel. The device 100 may detect the activities of the user/pilgrim, recognizes the ritual travel, and supports the ritual travel by guiding the user by providing interactive services. In one aspect, the automatic detection of the ritual travel may be implemented using the user device 114 through an application installed therefore. In some examples, the application may be a software or a mobile application from an application distribution platform. Examples of application distribution platforms include the App Store for iOS provided by Apple, Inc., Play Store for Android OS provided by Google Inc., and such application distribution platforms. In another aspect, the automatic detection of the ritual travel may be implemented through a web application accessible via a web browser on the user device 114.

In an exemplary aspect, the user may carry either or both the device 100 and the user device 114 to achieve the objective of the present disclosure. The device 100 and user device 114 are configured to record the physical activities of the user. Further, the device 100 is capable of communicating and synchronizing the recorded activities with the application running on the user device 114. In one embodiment, the application running on the user device 114 is also configured to capture or receive data from the device 100 for yielding synchronized result. In an aspect, the device 100 or/and the user device 114 is configured to operate independently to support the pilgrim during the ritual travel. Each of the device 100 and the user device 114 are capable of executing the methods to support ritual travel as described herein. In an aspect, the device 100 and the user device 114 can be coupled as a single device. In the case of temporary disconnecting, device 100 and user device 114 are capable of recording the data, and sharing data with each other after getting connected again. In one aspect, the method can be executed when the device is disconnected from a communication network. For example, the device can record the physical activities of the user and determine a user's trajectory and movements without external communications.

The device 100 and the user device 114 may have communications capabilities that include, but are not limited to, GPS, Bluetooth Low Energy (BLE), Wi-Fi, EDGE, 2G, 3G, 4G, LTE, wired network, Bluetooth®, Near Field Communications (NFC), Infrared (IR), etc.).

In a working aspect, the device 100 and/or the user device 114 may be carried by the pilgrim. In some examples, the device 100 and the user device 114 may have network connectivity. The device 100 and the user device 114 may include one or more sensors for monitoring physical conditions (such as location, motion, acceleration, orientation, and altitude) associated and generating sensor data. In an aspect, one or more sensors includes an accelerometer, a gyroscope, a magnetometer (digital compass), a pressure sensor, an orientation sensor, and an altimeter. Further, the device 100 and the user device 114 may obtain an estimate of its geographic location by acquiring and measuring wireless signals from a satellite positioning system (SPS), such as the GPS or other like Global Navigation Satellite Systems (GNSS) and from cellular base stations. Further, the device 100 and the user device 114 may generate a GPS data (e.g., GPS coordinates or GPS determined position information) based on the measured wireless signals. In an aspect, the sensors may also be external to the device 100 and the user device 114, and paired or grouped to the user device 114 and device 100 via a wired or wireless connection (e.g., Bluetooth® networks, WLAN networks, WiFi, etc.).

For example, and without limitation, the user device 114 may refer to a mobile device, Personal Digital Assistant (PDA), desktop computer, Global Positioning System (GPS) device, automotive navigation system, wearable object, smartwatch, wearable sensor, a cellular telephone, a tablet, a netbook, a wireless terminal, a laptop computer, a wearable computer device, customized travel device or any other device. In an aspect, the user device 114 may also include processing circuitry, memory, and/or a display.

In some examples, the device 100 may be commutatively coupled to the user device 114, and the device 100 may receive a plurality of information from the user device 114. In an aspect, the plurality of information includes the present location of the user device 114, access to contact numbers stored in the user device 114, access to call history of the user device 114, and information that may be received by various mobile applications already installed in the user device 114.

In an operative aspect, the pilgrim may register himself/herself with the device 100 or with the application in the user device 114 before starting the ritual travel. During registration with the device 100 or the application in the user device 114, the pilgrim may be prompted to enter personal details (for example, name, mobile number, age, gender, etc.). In some examples, when the device 100 and the user device 114 are used together, the device 100 may be configured and controlled using the application in the user device 114, or is self-adapted for configuration and control based on the sensor data received by the one or more sensors. In such examples, the device 100 is configured to collect sensor data from the sensors embedded in the user device 114. In an aspect, the device 100 is configured to receive the sensor data from the user device 114 after a predetermined time, thereby enhancing a battery life of the device 100. In another aspect, the device 100 is configured to receive sensor data from the user device 114 in real-time.

In one aspect, the device 100 and/or the user device 114 may be at least partially integrated into a garment or other wearable item, e.g., a scarf, a robe, a belt, an inner garment, shoes, etc. Components of the user device 114 may be embedded or integrated into the garment. In one aspect, the user device 114 may be separable, and components of the user device 114 may be distributed throughout the garment. Components may be distributed according to function. In one aspect, the user device 114 may be separated into memory and processing components (e.g., a microcontroller, a CPU) and data collection components (e.g., sensors). The memory and processing components may be integrated into the garment at a unified location, while the data collection components may be distributed through the garment. For example, a data collection component (e.g., processing circuitry and/or sensors) for determining a pace of the pilgrim may be integrated into an area of the garment in contact with one of the legs of the pilgrim. In another aspect, a number of components of the user device 114 may not be integrated into the garment but may be externally attached to the garment as a separate unit. The separate unit may be removable for ease of updating, swapping, or servicing.

In one aspect, the user device 114 may include a textile antenna and/or textile circuits configured to perform the processes detailed in the present application. The textile antenna and/or textile circuits may be woven into the garment. In one aspect, the textile antenna may enable wireless communication with other devices, e.g., the device 100. In one aspect, the components of the user device 114 may be in wireless or wired communication with each other. A wired communication path between components of the user device 114 may also be integrated into the garment. In one aspect, the user device 114 may include a memory wherein the memory is integrated into the garment. In one aspect, the user device 114 may store identify information, including, but not limited to, personal details as stated above. The user device 114 may also store data such as a location, an orientation, and/or a status.

In one aspect, the garment may be a reusable garment wherein the garment and the integrated user device 114 may be used by different pilgrims at different points in time. In one embodiment, the memory of the user device 114 integrated into the garment may be modified without damage to the garment or separation from the garment. In one aspect, the garment may include an electrical connector, wherein the electrical connector may be used to transmit data to and/or from the user device 114 integrated into the garment. In another aspect, data may be transmitted to and/or from the user device 114 integrated into the garment via a wireless connection.

Integration of the user device 114 into the garment may reduce distractions or obstructions that would otherwise hinder a pilgrim. In one aspect, the user device 114 may operate silently or at a low volume when integrated into the garment. For example, the user device 114 may cause the garment to vibrate in order to notify the pilgrim regarding the tracking of their ritual travel in an inobtrusive manner. In another aspect, the user device 114 may operate without visible indicators. The integrated user device may be especially advantageous during religious rituals requiring unfettered motion of hands and arms. In addition, the integrated user device may be used in environments that prohibit accessory items such as purses or backpacks.

In one embodiment, the device and/or the user device 114 may adjust for an orientation of the user device 114 embedded in the garment. For example, components of the user device 114 may be distributed throughout the garment. The orientation of at least one of the components of the user device may be detected by at least one sensor distributed throughout the garment. The orientation of the at least one of the components may be aggregated and/or analyzed to determine an orientation of the wearer of the garment and a heading direction of the wearer of the garment. The location of the at least one of the components may be used to determine the orientation and the heading direction of the wearer. In one aspect, the orientation of the at least one of the components may be mapped from a first coordinate system (e.g., a component coordinate system) to a second coordinate system (e.g., a global coordinate system).

The device 100 and/or the user device 114 may be communicatively coupled to the central office 112 periodically or continuously. In an aspect, the device 100 has a unique ID, and may be linked with the central office 112. Similarly, the application in the user device 114 may have a unique ID, and may be linked with the central office 112. In an aspect, the central office 112 is a government agency and/or a public agency which is configured to analyze the received data for performing several tasks such as managing the crowd, making announcements, tracking of the pilgrim via the registered device 100, handling emergency situations such as fire, earthquake, and such tasks. In an aspect, the central office 112 may store the details of pilgrims, unique IDs corresponding to the plurality of devices, registration details of each pilgrim corresponding to each device 100, etc. In an exemplary aspect, the central office 112 is a remotely placed server, or a server placed locally on a network owned by a government or private facility utilizing the disclosed invention. The central office 112 is also configured to track one or more performance indicators identified by the government agency and/or to provide report instances of defined types of events. Such as, performance indicators include the maximum number of pilgrims allowed at the pilgrimage, latency to locate a pilgrim in case of lost, etc. Thus, in some examples, the government agency uses the central office 112 to collect data pertaining to compliance of an interaction system with one or more statutes or regulations. The device 100 and/or the user device 114 may be configured to upload sensor data to the central office 112 for storing, processing or analysis.

Referring to FIG. 1, the device 100 includes a processing circuitry 102, a memory 104, and a display 106. In an aspect, the device 100 includes a housing, a strap, and a speaker.

In an operative aspect, the processing circuitry 102 is configured to receive the sensor data from the user device 114 via the data communication network 110. After receiving the sensor data from the user device 114, the processing circuitry 102 is configured to pre-process the received sensor data to generate preprocessed data. In an aspect, the pre-processing of the data includes various steps such as data preparation, data filtration, data transformation, data validation and grouping data. In an aspect, the device 100 may be configured to stream the preprocessed data on the display 106 such that the device 100 provides real-time information to the pilgrim.

The memory 104 is configured to store program instructions. In an aspect, memory 104 is configured to store a predefined set of coordinates, specific direction, and predefined coordination. The memory may include a map module storing data representing a map of the premises including known coordinates for a plurality of reference landmarks. The memory 104 is also configured to store a predefined set of heading angles from various coordinates to a central landmark. In an aspect, the memory 104 is configured to store a Machine Learning (ML) model and a training set for training the ML model. The stored program instructions include a program that implements a ML method for automatic detection of ritual travel may implement other embodiments described in this specification. In an aspect, the ML model is configured to auto-update by adding the received sensor data from the user device 114. The memory 104 is configured to store preprocessed data. In another aspect, the memory 104 is configured to store a plurality of media files such as chants, prayers, etc. The memory 104 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The processing circuitry 102 is configured to cooperate with the memory 104 and to fetch and execute computer-readable instructions stored in the memory 104. According to an aspect of the present disclosure, the processing circuitry 102 may be implemented as one or more microprocessors, microcomputers, microcontrollers, digital signal processors, central processing units, state machines, logic circuitries, and/or any devices that manipulate signals based on operational instructions.

Figure 3:
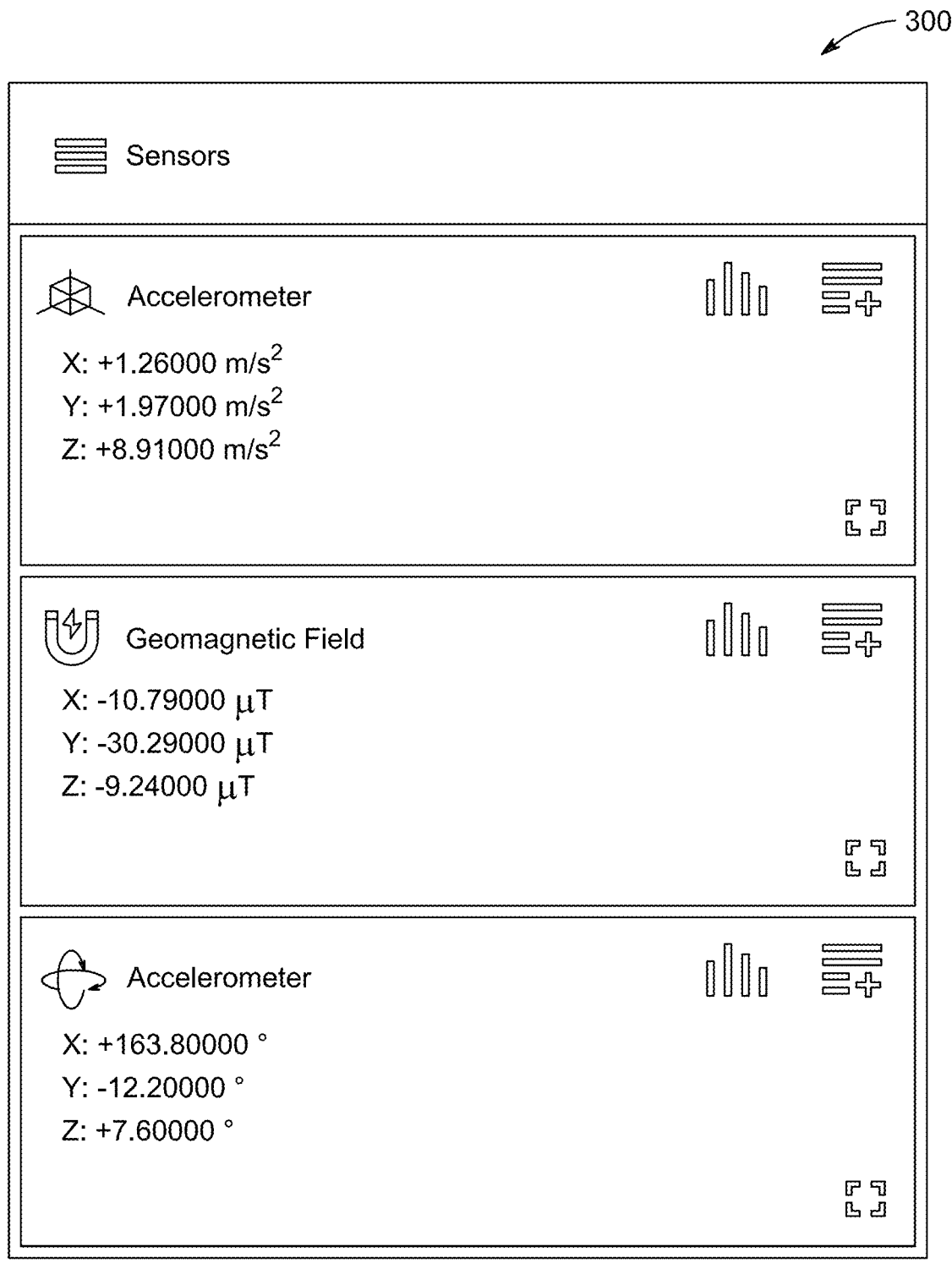
FIG. 3 illustrates an exemplary representation of various sensor data on a display of the device, according to certain embodiments.

Further, the processing circuitry 102 is configured to determine a relative location and an angle of travel of the user device 114 relative to the central landmark, a first endpoint, and a second endpoint based on the received sensor data. In a working example, the processing circuitry 102 is configured to transform the received sensor data to at least one coordinate system. The received data indicates an inertial information about the user device 114, rather than the pilgrim. For example, the user device's 3-axis accelerometer provides the values of acceleration components in three orthogonal directions (as shown in FIG. 3). These three orthogonal directions are defined with respect to the orientation of the user device 114 or in a device coordinate system (DCR). To find the location and orientation of the pilgrim, a transformation technique may be employed which converts the received data from the DCR to a global coordinate system (GCS) (also known as the world coordinate system).

The GCS refers to an absolute coordinate system in a mapping system. The coordinates of the GCS are considered as a reference for determining the relative location of the pilgrim. The data received by the DCR is compared with the reference coordinates of the GCS, and a user coordinate system is established. In an aspect, the present device 100 is configured to employ two transformation techniques for transforming the received DCR data into the GCS. One transformation technique may be configured to use the notion of quaternions, and the other transformation technique is based on the Euler rotation theorem.

In an exemplary aspect, the 3-axis accelerometer may be arranged to generate accelerometer signals (sensor data) representing the three orthogonal components of the gravity vector in a local device coordinate system and a 3-axis magnetometer that is arranged to generate magnetometer signals (sensor data) representing the three orthogonal components of the Earth's magnetic field vector in the local device coordinate system. To determine the angle of travel of the user device 114, the processing circuitry 102 may follow some exemplary steps:

(a) defining a 3-axis local coordinate system for the sensor (user device 114) and a 3-axis GCS;

(b) receiving information/data from the accelerometer and the magnetometer during traveling;

(c) generating rotation matrices representing an absolute 3D orientation of the sensor (user device 114) with reference to the 3-axis local coordinate system and 3-axis GCS;

(d) processing the rotation matrices to extract angular rotation data relating to the angular rotation of a reference vector of the 3-axis local coordinate system in the movement plane of the 3-axis GCS; and (e) generating a measurement of the angular rotation of the user device 114 based on the angular rotation data.

Further, the processing circuitry 102 is configured to track a path (on which pilgrim travels) after processing the received sensor data from the sensors. The processing circuitry 102 is configured to track the path by employing Pedestrian Dead Reckoning (PDR), an IMU-based location tracking method. In the PDR, the user device 114 is configured to estimate its heading direction, detect each step of the pilgrim, and estimate a corresponding step length of the pilgrim using a magnetometer, a gyroscope, an orientation sensor, and an accelerometer. The PDR involves two primary tasks, namely: step counting and heading estimation. Step counting is inferred from the accelerometer. The accelerometer is also used for step length estimation. Heading estimation is inferred from the azimuth which is provided by the orientation sensor.

The processing circuitry 102 is configured to detect an initial lap around the central landmark (Tawaf detection) based on the relative location and the angle of travel of the pilgrim. To detect the initial lap, the processing circuitry 102 is configured to check a distance of the pilgrim from the central landmark (a first trigger condition), indicating that the pilgrim/user should be within a radius range to start the Tawaf (not too far from the central landmark). The processing circuitry 102 detects the first trigger condition using the GPS sensor. Further, the processing circuitry 102 is configured to initialize the path from a starting point using the GPS sensor data. Since the location of the central landmark (Kaaba) is predefined by GPS, the X,Y coordinates of the entire path are obtainable with the reference set to the central landmark. From the GPS sensor data, the processing circuitry 102 is configured to obtain radius and angle for each point (corresponding to the pilgrim travelled in the path). The processing circuitry 102 further checks a second trigger condition by measuring the starting angle condition of the pilgrim. The second trigger condition is fulfilled when the pilgrim is in the correct position around the central landmark (Kaaba center) 202 to start the Tawaf. If the measured angle condition of the pilgrim is correct, then the processing circuitry 102 detects the initial lap of the pilgrim. If the angle condition of the pilgrim is not found in the correct position, the processing circuitry 102 is configured to generate an alert to the user indicating to change his angle position.

After detecting the initial lap, the processing circuitry 102 is configured to detect a number of laps taken around the central landmark. For detecting/counting the number of laps, the processing circuitry 102 is configured to detect a pace of the number of laps. In an aspect, the Tawaf contains seven rounds/laps around the central point in a clockwise direction. For detecting the number of laps taken around the central landmark, the Tawaf area is divided into five (5) regions (for example), one region for each quarter except for the fourth quarter which has two regions to make it easier to detect lap endings. The processing circuitry 102 collects a sample from the sensor data from the sensors and checks several conditions to make sure the pilgrim is performing the Tawaf. The processing circuitry 102 checks if the pilgrim is in the current region (the region that the pilgrim is in the last sample), if so, the processing circuitry 102 counts that as a correct sample. If the pilgrim is not in the current region, the processing circuitry 102 further checks if the pilgrim is in the next/following region. If that is the case, the processing circuitry 102 would then check to see if the pilgrim finished enough correct samples in the current region for a proper transition to the next region. The processing circuitry 102 also checks whether the pilgrim has spent enough time/samples in the current region to count as a completed region. If the pilgrim is not in the current or next region or has broken the radius conditions, then processing circuitry 102 is configured to generate an error and prompts the alert to the pilgrim to check whether the pilgrim plan to continue, stop, or take a break and then continue, displayed on the display 106.

The processing circuitry 102 is configured to repeat the above-mentioned actions, and increment a counter after completion of the lap. The processing circuitry 102 generates the alert for the pilgrim when the lap counter reaches seven (7) (Tawaf completed), displayed on the display 106.

After detecting that the Tawaf has been completed, the processing circuitry 102 is configured to detect a route of travel (known as Sa'i Detection) between the first endpoint 206 and the second endpoint 208. After finishing the Tawaf, the pilgrim heads to the Masa'a area to start performing Sa'i. To detect whether the pilgrim has started Sa'i ritual or not, the processing circuitry 102 checks whether the pilgrim has travelled a distance of 100 m or not (a first initial condition in an aspect). A second initial condition is to check/determine a heading angle of the pilgrim. In an aspect, the heading angle requires to be in the range of [−30,0], which is considered as the movement direction of Safa lap. The direction of the pilgrim is evaluated through the determined heading angles measured by the sensor associated with the user device 114.

After satisfying the first and second initial conditions, an automatic trigger is initialized and the processing circuitry 102 collects data from the sensors to check direction integrity and to calculate the distance traveled through each lap. For the azimuth, a predefined specific range of values is used for Safa and Marwa lap detection, as sensors do not give a single value for one direction, and the pilgrim in the practical case cannot move in a straight line. In an aspect, the predefined ranges of values for Safa lap are [−30,0] and for Marwa lap [150,180]. These values are chosen based on the direction of the Masa'a.

After detecting the initial lap, the processing circuitry 102 is configured to detect a number of laps taken between the first endpoint 206 and the second endpoint 208. In an aspect, the Sa'i contains seven laps between the first endpoint 206 and the second endpoint 208. To count the number of laps, the processing circuitry 102 is configured to check if the pilgrim is in the current region (the region that the pilgrim is in the last sample), if so, the processing circuitry 102 counts that as the correct sample. If the pilgrim is not in the current region, the processing circuitry 102 checks if the pilgrim is in the next/following region. The processing circuitry 102 is configured to repeat the above-mentioned actions, and increment a counter after completion of each lap. The processing circuitry 102 generates the alert for the pilgrim when the lap counter reaches 7 (Sa'i completed), displayed on the display 106.

In an aspect, the processing circuitry 102 is further configured to detect and count a plurality of routes between the first endpoint 206 and the second endpoint 208, wherein each of the plurality of routes traverses a different path. In an aspect, the plurality of routes may be employed for crowd management in an effective manner.

In an aspect, the processing circuitry 102 is configured to transmit the processed data to the display 106. The display 106 is configured to display the current position of the pilgrim in a form of a pushpin on a map relative to the center landmark, the first endpoint 206, and the second endpoint 208. Further, the processing circuitry 102 is configured to detect the user's activity and provide useful information to the user based on his location and situation. In an aspect, the user's activity includes pace of the user, posture of the user. In another aspect, the display 106 is configured to display personal information, media files fetched from the memory 104, a number of steps taken, total distance covered, and such information. The display 106 may be any type of electronic visual or digital display adapted for use with the processing circuitry 102.

In an operative embodiment, the processing circuitry 102 is configured to store the data corresponding to the whole travel and is further configured to generate a report that may be displayed on the display 106 or may be downloaded by the pilgrim on the user device 114.

The processing circuitry 102 is further configured to employ ML to detect the number of laps taken around the central landmark and/or the route of travel between the first endpoint 206 and the second endpoint 208. In an aspect, the processing circuitry 102 is further configured to determine an optimal route between the first endpoint 206 and the second endpoint 208 based on the plurality of routes using ML. The triggering method and conditioning criteria may develop through training of the ML model. The ML may be employed for step detection, heading correction, travel path detection, and feedback suggestion.

In an aspect, the processing circuitry 102 is further configured to provide customized directions for crowd reduction based on the relative location. The display 106 is configured to display step-by-step directions to the user. In another example, the customized directions could be audible.

Figure 2:
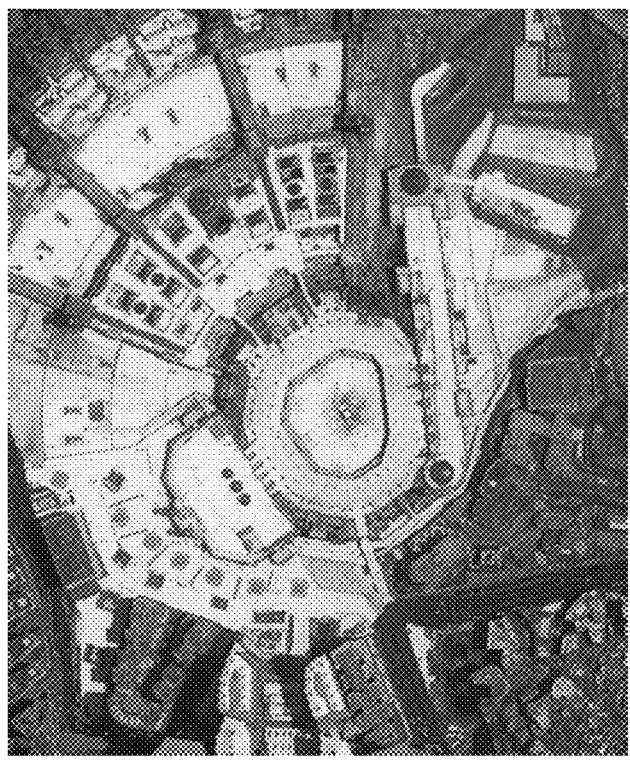
FIG. 2 illustrates an exemplary schematic of a predetermined ritual travel, according to certain embodiments.
Figure 2:
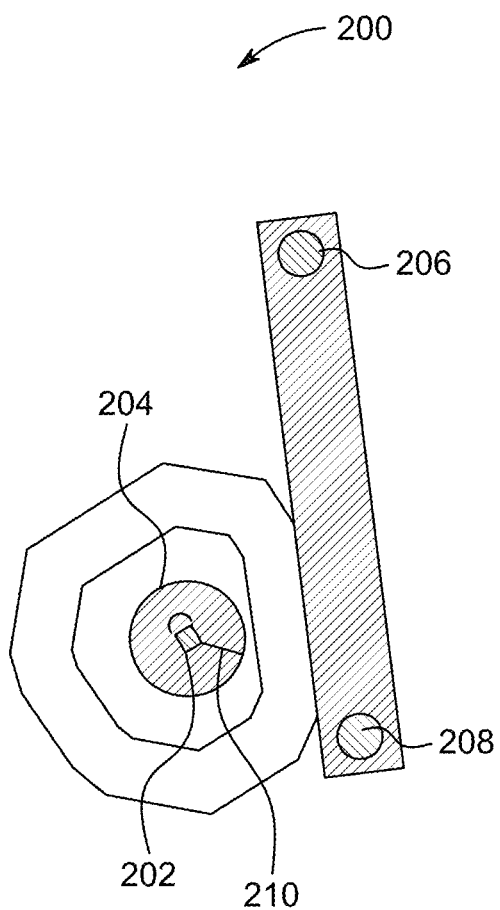

FIG. 2 illustrates an exemplary map 200 of a predetermined ritual travel, according to certain embodiments.

As shown in FIG. 2, various predetermined areas that should be visited during Hajj and Umrah in Makkah, Saudi Arabia are highlighted. In an aspect, the predetermined areas and locations are strictly defined according to the Islamic laws. The predetermined areas include the central landmark "Kaaba" 202, "Tawaf" 204, the first endpoint "Marwa hill" 206, and the second endpoint "Safa hill" 208. Tawaf 204 is the ritual performed in the Mataf area. Tawaf 204 is performed by circulating the Kaaba 202 seven times in the counterclockwise course starting from Al-Hajar Al-Aswad (the Black Stone) 210 while reciting supplications and prayers. For ritual Sa'i, the pilgrim travels between the Safa hill 208 (second endpoint) and the Marwa hill 206 (first endpoint) seven times while reciting supplications and prayers.

A boundary of the predetermined area may be stored in the central office 112 in terms of a set of latitude and longitude coordinates. In an aspect, the set of latitude and longitude coordinates is stored in the memory 104 of the device 100. In another aspect, the device 100 is configured to auto-update the map of the predetermined area in communication with the central office 112 via the network 110 to verify that the coordinates stored in the memory 104 of the device 100 are up to date. Further, if there is any change in the boundary and predetermined area, the central office 112 is configured to transmit a notification regarding the changes in the area boundaries and locations to the device 100. In some embodiments, in case of any event, the central office 112 may be configured to send an alert to the device 100 about restricted areas during the event. For example, street C may be closed for traffic for a certain duration. In an aspect, the event may be a traffic, marathon, an accident or something like so. In another aspect, the central office 112 may be configured to share a diverting way to the device 100 in real-time. FIG. 3 illustrates an exemplary interface 300 of the device 100 showing various sensor data, according to certain embodiments. In an exemplary aspect, the interface 300 shows data received from the various sensors installed within the user device 114.

The present disclosure detects the Hajj and Umrah activities (like ritual travel) using the user device's sensors only. In an aspect, the present disclosure detects the Hajj and Umrah activities by employing two methods. In a first method, the device 100 processes the sensor data such as acceleration and velocity to predict human activities, which is known as an activity recognition. The activity recognition is used in sport and fitness applications, where a smartphone monitors the activities of the user during the day. These activities include walking, running, cycling, sleeping, and more. However, in view of the objectives of the present device, Umrah, namely Tawaf and Sa'i may not be characterized by the motion modes only, as they include several activities in the same ritual. For example, in Tawaf, the user may walk, run, or take a rest sometimes, and the same thing applies to Sa'i, making it impossible for detection using the activity recognition technique. Even if these rituals are detected using the activity recognition, counting the number of circulations around the Kaaba (Tawaf) or Sa'i serves is still unfeasible. The present device 100 also employs path tracking techniques along with the activity recognition, thereby providing accurate results.

For a working example, the sensor data is received from the accelerometer, magnetic field sensor, and orientation sensor. The sensor data is represented into three (3) coordinates (namely X, Y and Z). In an exemplary aspect, the user device's 3-axis accelerometer provides the values of acceleration components in three orthogonal directions. These orthogonal directions are defined with respect to the user device's orientation or in the DCR. The given data from DCR is transformed/converted to the GCS such that the performance of the device 100 improves. By transforming the device coordinate system into the corresponding GCS, the device 100, using the processing circuitry 102, is configured to determine the relative location and the angle of travel of the user device 114 relative to the central landmark, the first endpoint, and the second endpoint.

Further, based on the relative location and the angle of travel of the user device 114, the processing circuitry 102 detects the initial lap around the central landmark 202. In some aspects of the present disclosure, GPS triggers the initial lap detection. In an aspect, the processing circuitry 102 is configured to employ machine learning to detect the number of laps taken around the central landmark and/or the route of travel between the first endpoint 206 and the second endpoint 208.

A Kalman filter is employed for taking divergent estimation of the gyroscope as an input for a prediction process. The output of the Kalman filter is further corrected using a noisy estimation of the accelerometer and magnetometer. Given the distribution of these three data, Bayesian estimation may be used for maximizing the likelihood, the probability of getting the mentioned input data given the corrected prediction, which, in turn, maximizes the posterior probability, which is the probability of getting the orientation given the data.

The orientation sensor is used to update the heading angle of the user at each step. However, due to the unknown position of the user device 114 while moving, a method is employed for correcting the orientation of the user device 114 such that the heading angle of the user is consistent with the user's direction of motion.

Figure 4:
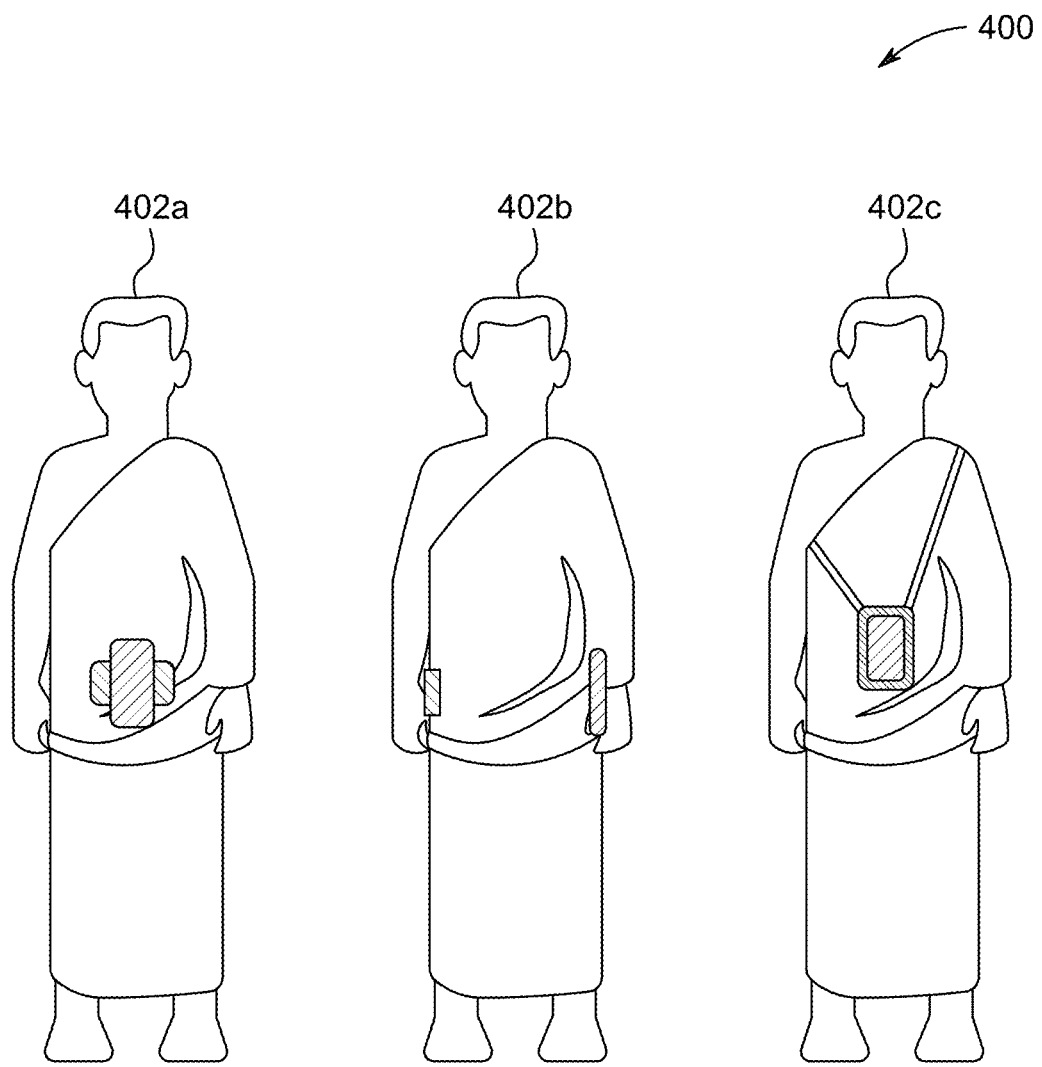
FIG. 4 illustrates a front view of a pilgrim having a user device in different positions, according to certain embodiments.

FIG. 4 illustrates a front view of a pilgrim carrying a user device in different possible ways. The user may carry the user device 114 in a random way depending upon his/her comfort level. As shown in FIG. 4, there are certain positions the mobile device is most likely to be positioned by the user, such as, vertical or horizontal to a belt (402 a), vertical or horizontal besides the body (402 b), and vertical or horizontal inside a bag (402 c). Other positions not disclosed here are contemplated herein. The processing circuitry 102 is configured to identify the current position of the user device 114. The processing circuitry 102 is also configured to identify the current position of the user device out of the certain positions of the user device 114 most likely positioned by the user and further correct the heading angle of the user accordingly.

In an aspect, the heading angle can be corrected by detecting the orientation of the user device 114 using acceleration components. A heading angle of the user device 114 may not be the same as a heading angle of a user in possession of the user device 114 due to the positioning of the user device 114. Therefore, a correction may be applied to determine the heading angle of the user. The acceleration component dominated by gravity can be identified. The acceleration component dominated by gravity may be in one aspect a vertical component. A tilt compensation can be applied to the acceleration component based on the difference between the acceleration component and the gravity component. An angle can be assigned to align the heading of the user device 114 with the user's direction of motion. The angle can be based on a straight orientation of the user device 114 rather than a tilted orientation. In one aspect, an alert may be generated on the user device 114 to inform the user to maintain a desired orientation of the user device 114.

In an aspect, the processing circuitry 102 may be configured to average the acceleration values during the step time to check that the average acceleration value lies within a predefined range or not, and to update the heading angle at each step.

Figure 5:
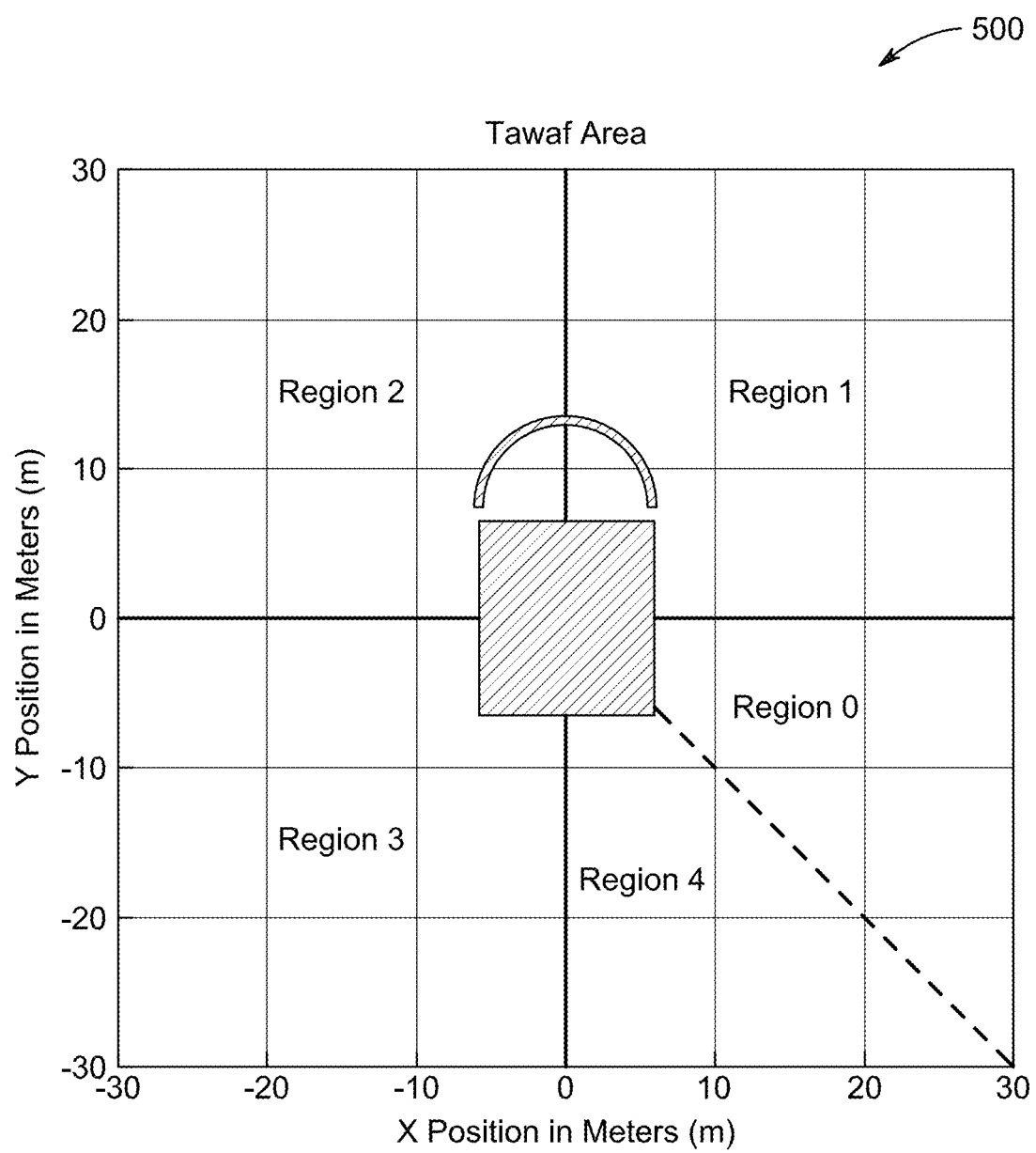
FIG. 5 illustrates an allocation of a predetermined area into various regions for detection of the ritual travel, according to certain embodiments.

FIG. 5 illustrates an allocation of the predetermined area into various regions for detection of the ritual travel, according to certain embodiments. As shown in FIG. 5, various regions are used for detecting the Tawaf ritual.

In a working aspect, the processing circuitry 102 is configured to detect the pilgrims performing Tawaf. After detecting Tawaf movements, the device 100 is configured to provide feedback to the user based on his current lap count and position in the Tawaf area. The processing circuitry 102 is configured to detect an angle with respect to the Kaaba center 202 for Tawaf detection. However, the processing circuitry 102 checks several other conditions for the integrity of the detection to avoid errors. The processing circuitry 102 is configured to take input data from various sources such as Tawaf Model, GPS data, and IMU sensors data. The processing circuitry 102 is configured to detect the Tawaf using a path generated using the navigation systems. For example, these navigation systems may include a global positioning system (GPS), a differential global positioning system (DGPS), a real-time kinematic global positioning system (RTK-GPS), an odometer, an inertial measurement unit (IMU), and any associated motion sensors.

In an aspect, the Tawaf Model includes different sections of the Tawaf area. Each section of the Tawaf area has different properties. Therefore, the sections of the Tawaf area are further divided into sub-sections to represent different speed-density. Region 0 is very favorable to pilgrims who would attempt to reach and touch the Kaaba walls and pray in this section. Region 0 also has an arbitrary Tawaf start-finish line or area. Too many people in these sections may cause congestion in the area since pilgrims either start their Tawaf or cross the Tawaf circumambulation for exits. The regions 1, 2, 3, and 4 are also chosen for comparison since they lack such congestion.

As a first step, the processing circuitry 102 is configured to initialize the path from a starting point using the GPS sensor data. Since the Kaaba center 202 (center of rotation) location is predefined by GPS, the X,Y coordinates of the entire path are obtainable with the reference set to the Kaaba center 202. From that, the processing circuitry 102 is configured to obtain the radius and angle of the user device 114 for each point in the path. The processing circuitry 102 is configured to detect the first trigger condition when the pilgrim is assumed to start Tawaf and when the detection should begin. The processing circuitry 102 is configured to determine the distance of the pilgrim from the GPS data from the Kaaba center 202. The processing circuitry 102 determines whether the pilgrim is within a radius range to start the Tawaf (not too far), acting as the first trigger condition. The processing circuitry 102 further checks a second trigger condition by measuring the starting angle condition of the pilgrim. The second trigger condition is fulfilled when the pilgrim is in the correct position around the Kaaba center 202 to start the Tawaf. After the pilgrim starts Tawaf, then the processing circuitry 102 is configured to detect the lap and count the total number of laps. Here the Tawaf area was divided into five (5) regions (for example), one region for each quarter except for the fourth quarter, which has two regions to make it convenient to detect lap endings.

Then the processing circuitry 102 extracts a sample from the received sensor data from the user device 114. For each sample, the processing circuitry 102 is configured to apply certain conditions to check whether the pilgrim is performing Tawaf or not. The main condition involves the angle of travel of the user device 114. The processing circuitry 102 checks if the pilgrim is in the current region (the region that the pilgrim is in the last sample), if so, the processing circuitry 102 counts that as a correct sample. If the pilgrim is not in the current region, the processing circuitry 102 checks if the pilgrim is in the next/following region. If that is the case, the processing circuitry 102 checks to see if the pilgrim finished enough correct samples in the current region for a proper transition to the next region. This serves as a time restriction where the pilgrim should have spent enough time/samples in the current region for it to count as a completed region. If the pilgrim is not in the current or next region or has broken the radius conditions, then the processing circuitry 102 generates an error message and prompts the pilgrim to check whether he plans to continue, stop, or take a break and then continue. These actions continue where the region counter resets every lap, and the processing circuitry 102 transmits the alert to the pilgrim that the Tawaf has been completed. To tolerate some known and random errors, a success percentage was introduced where only a percentage of samples need to be correct for proper region transition. The success percentage currently may be set to 80%, 90%, >90% or between 70% to 90%.

Figure 6:
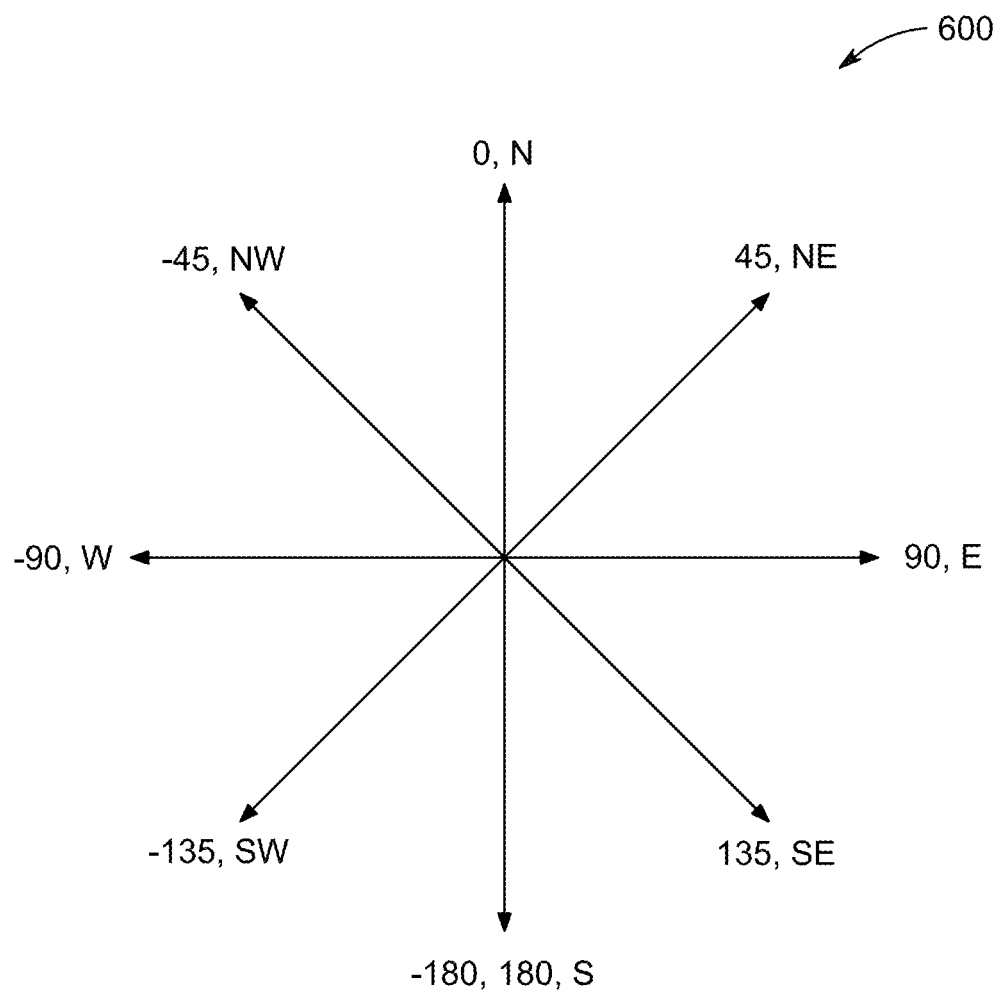
FIG. 6 illustrates an exemplary schematic of angles and global coordination, according to certain embodiments.

FIG. 6 illustrates an exemplary schematic of angles and global coordination for Sa'i detection, according to certain embodiments.

After the pilgrim finishes Tawaf, he heads to the Masa'a area to start performing Sa'i. After traveling for around 100 m (a first initial condition for Sa'i detection), the processing circuitry 102 starts the Sa'i counting. A second initial condition for Sa'i detection is to check the heading angle of the pilgrim to be in the range of [−30,0], which is considered as the movement direction of Safa lap. If the heading angle of the user is not found in the range, the processing circuitry 102 is configured to generate the alert for the pilgrim for correcting the heading angle, display on the display 106. The direction of the pilgrim is estimated by the processing circuitry 102 by using corrected heading angles of the pilgrim.

After the detection of Sa'i has been initiated, the processing circuitry 102 is configured to receive an instant sample from the sensor data. The processing circuitry 102 is configured to check direction integrity and to calculate the distance traveled through each lap by analyzing the instant sample. For the azimuth, the present device 100 specifies a range of values for Safa and Marwa lap detection, as sensors do not give a single value for one direction, and the pilgrim in the practical case cannot move in a straight line. The proposed ranges of values for Safa lap are [−30,0] and for Marwa lap [150,180]. These values are chosen based on the direction of the Masa'a.

In an aspect, the device 100 is configured to send an emergency message or call to the contact received from the contact list of the user or number provided by the user during registration with the device 100 if the pilgrim gets lost during pilgrimage. In another aspect, the processing circuitry 102 is configured to detect and monitor various health parameters of the pilgrim, such as heart rate, oxygen level, and alert the pilgrim if the health parameters are outside of a defined parameter.

In an aspect, the device 100, in communication with the central office 112, is configured to provide helpful information to the responsible management, e.g., inside Haram, about the number of users, heat maps, and Umrah statistics in general, resulting in improved crowd management.

In an aspect, the device 100 is configured to provide a comprehensive navigation system that guides the pilgrim to the several services indoors and outdoors premises of the pilgrimage. The comprehensive navigation system can guide pilgrims along routes designed to improve crowd management. For example, the device 100 can advise a route to a pilgrim wherein the route avoids large gatherings. In another example, each pilgrim can receive a different route to avoid crowding or collision in a certain area. The routes can be coordinated between devices and/or the central office.

In an aspect, the device 100 has a battery (not shown in FIGS) for providing power to the units of the device for proper functioning. In an aspect, the battery may be a disposable dry cell battery, or a rechargeable battery that can be coupled to a charging device or connected or coupled to a standard outlet for electrical power, for example. The device 100 is configured to optimize the power consumption.

Figure 7:
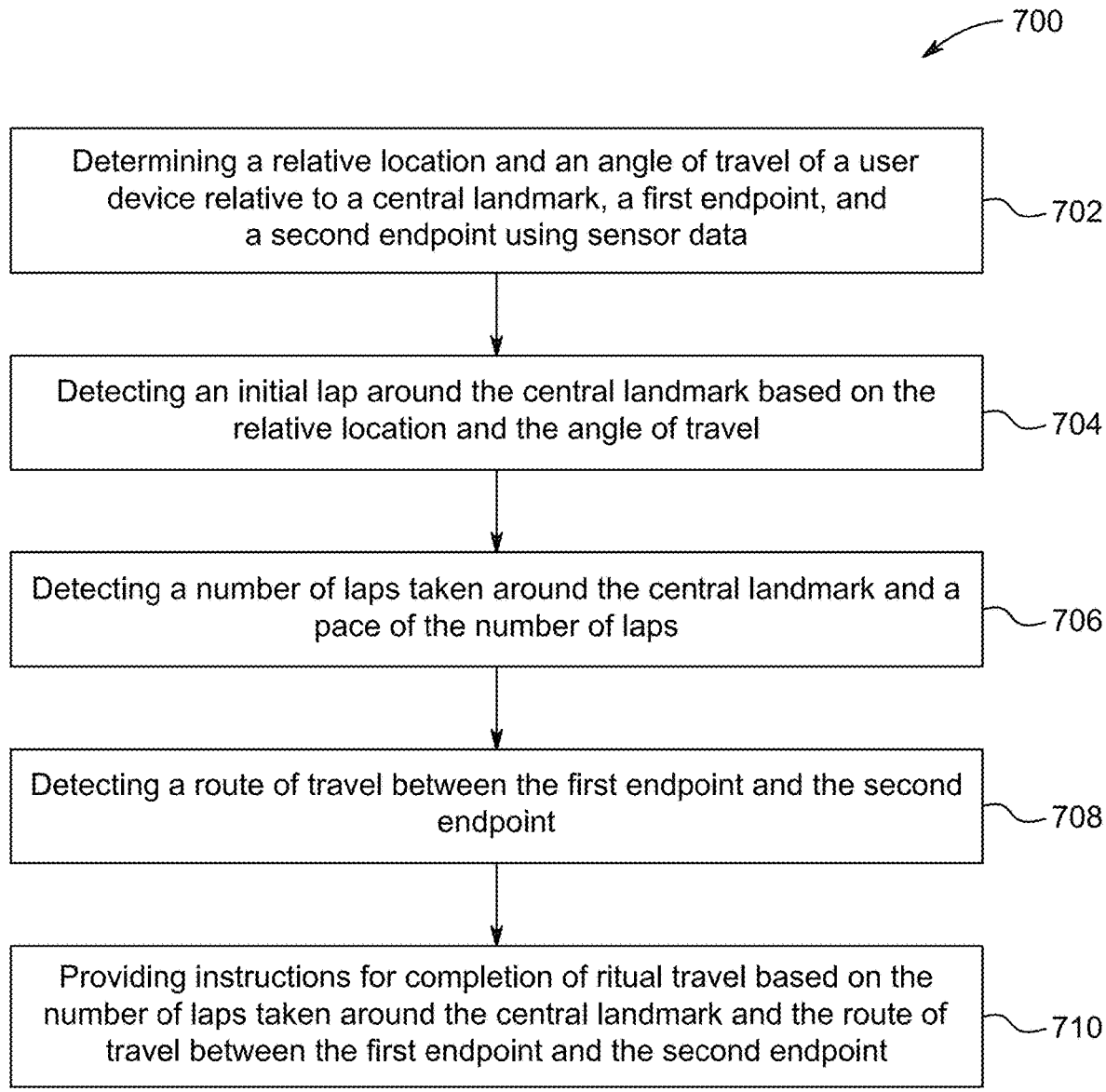
FIG. 7 illustrates a method for automatic detection of ritual travel, according to certain embodiments.

FIG. 7 illustrates a process flow 700 for automatic detection of ritual travel, according to certain embodiments.

Step 702 includes determining a relative location and an angle of travel of the user device 114 relative to a central landmark 202, a first endpoint 206, and a second endpoint 208 using sensor data. In an aspect according to the present disclosure, the processing circuitry 102 is configured to determine the relative location and the angle of travel of the user device. In another aspect, the processing circuitry 102 receives the sensor data from the user device 114 via a data communication network 110 and transforms the sensor data to at least one coordinate system.

Step 704 includes detecting an initial lap around the central landmark 202 based on the relative location and the angle of travel. In another aspect, the processing circuitry 102 is configured to detect the initial lap around the central landmark 202 based on the sensor data.

Step 706 includes detecting a number of laps taken around the central landmark 202 and a pace of the number of laps. In an aspect according to the present disclosure, the processing circuitry 102 is configured to employ machine learning to detect the number of laps taken around the central landmark 202 and/or the route of travel between the first endpoint 206 and the second endpoint 208.

Step 708 includes detecting a route of travel between the first endpoint 206 and the second endpoint 208. In an aspect according to the present disclosure, the processing circuitry 102 detects and counts a plurality of routes between the first endpoint 206 and the second endpoint 208, wherein each of the plurality of routes traverses a different path. In an aspect, the processing circuitry 102 is configured to employ machine learning to determine an optimal route between the first endpoint 206 and the second endpoint 208 based on the plurality of routes. Further, the processing circuitry 102 provides customized directions for crowd reduction based on the relative location.

Step 710 includes providing instructions for the completion of ritual travel based on the number of laps taken around the central landmark and the route of travel between the first endpoint 206 and the second endpoint 208.

An embodiment is illustrated with respect to FIGS. 1-7. The embodiment describes a non-transitory computer-readable storage medium for storing computer-readable instructions that, when executed by the device 100, cause the device to perform a method, the method includes determining a relative location and an angle of travel relative to a central landmark 202, a first endpoint 206, and a second endpoint 208 using sensor data; detecting an initial lap around the central landmark 202 based on the relative location and the angle of travel; detecting a number of laps taken around the central landmark 202 and a pace of the number of laps; detecting a route of travel between the first endpoint 206 and the second endpoint; and providing instructions for completion of ritual travel based on the number of laps taken around the central landmark and the route of travel between the first endpoint 206 and the second endpoint 208.

The non-transitory computer readable medium method further includes using machine learning to detect the number of laps taken around the central landmark and/or the route of travel between the first endpoint 206 and the second endpoint.

The non-transitory computer readable medium method further includes transforming the sensor data to at least one coordinate system.

The non-transitory computer readable medium method further includes detecting and counting a plurality of routes between the first endpoint 206 and the second endpoint 208 wherein each of the plurality of routes traverses a different path.

The non-transitory computer readable medium method further includes determining an optimal route between the first endpoint 206 and the second endpoint 208.

The non-transitory computer readable medium method further includes providing customized directions for crowd reduction based on the relative location.

While this specialized device is capable of efficiently supporting Hajj pilgrimage has been described above, the scope of the present invention is not limited thereto and the principle of the present invention can be equally applied to other pilgrimage of other religions such as Christianity, Judaism, Hinduism, Buddhism, etc. Further, this device 100 may be employed in various events such as Fairs, festivals, marathons, hiking, crowd control, Olympics games, that may have fixed navigation routes, requiring smooth exits and crowd management in an efficient manner. Further, the present disclosure may be employed in indoor entities such as hospitals, airports, bus stations, train stations, metro stations, universities, evacuation in big factories (workers can have device or mobile application in their user devices which guides them to appropriate exits and for assembly.)

Figure 8:
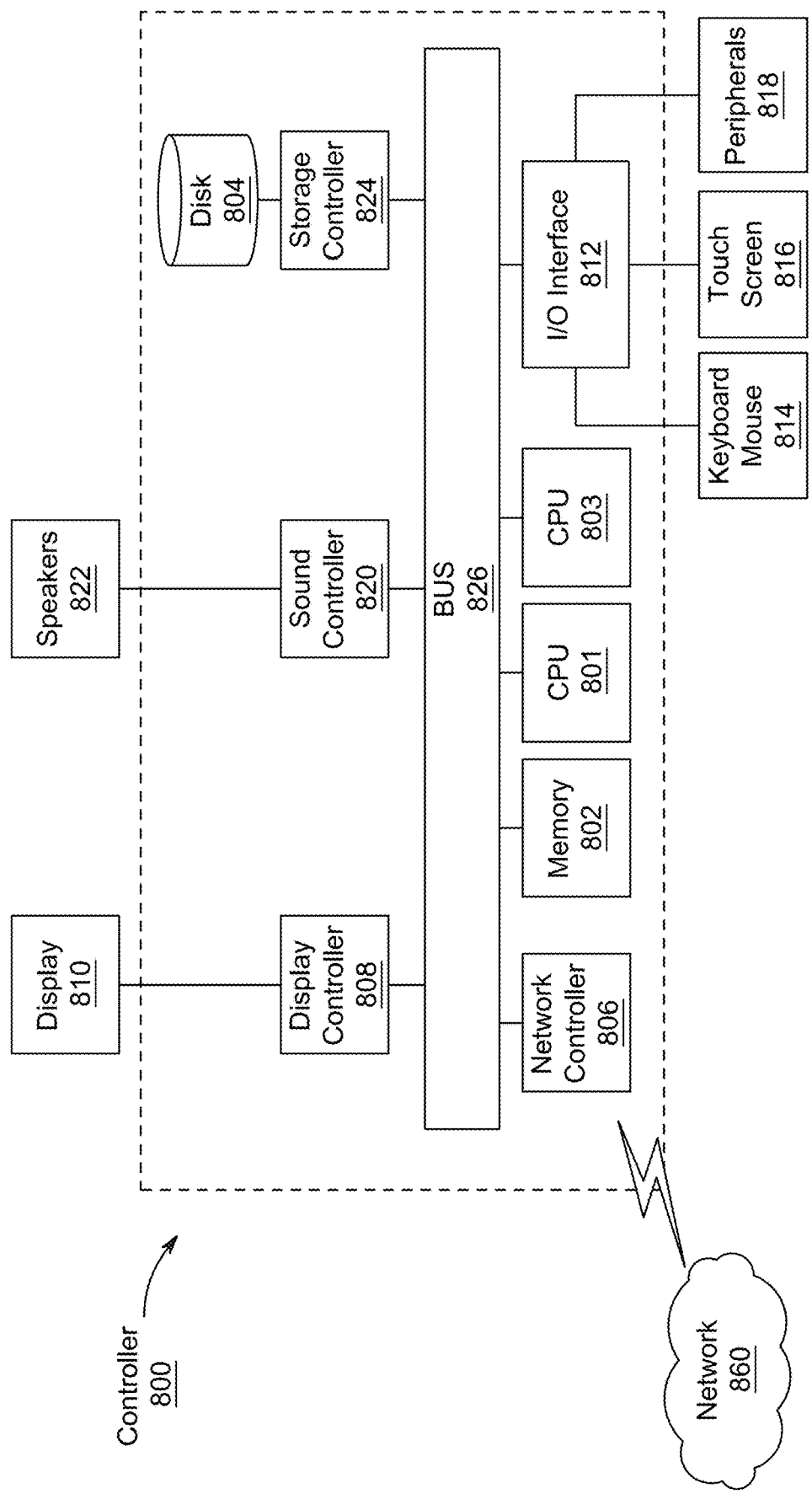
FIG. 8 is an illustration of a non-limiting example of details of computing hardware used in the computing system, according to certain embodiments.

Next, further details of the hardware description of the computing environment of FIG. 1 according to exemplary embodiments is described with reference to FIG. 8. In FIG. 8, a processing circuitry 800 is described as representative of the device 100 and/or user device 114 of FIG. 1 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skilled in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
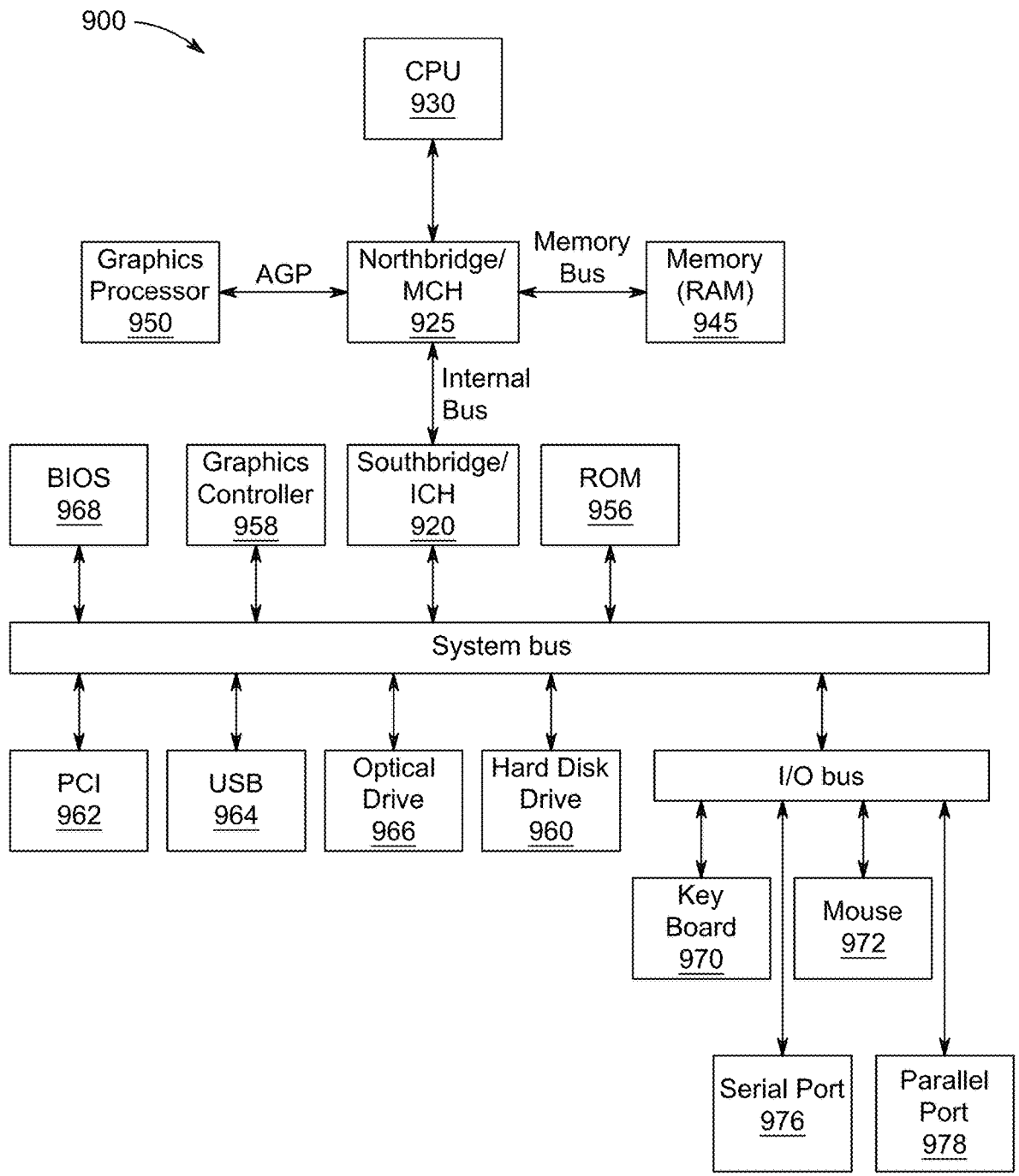
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
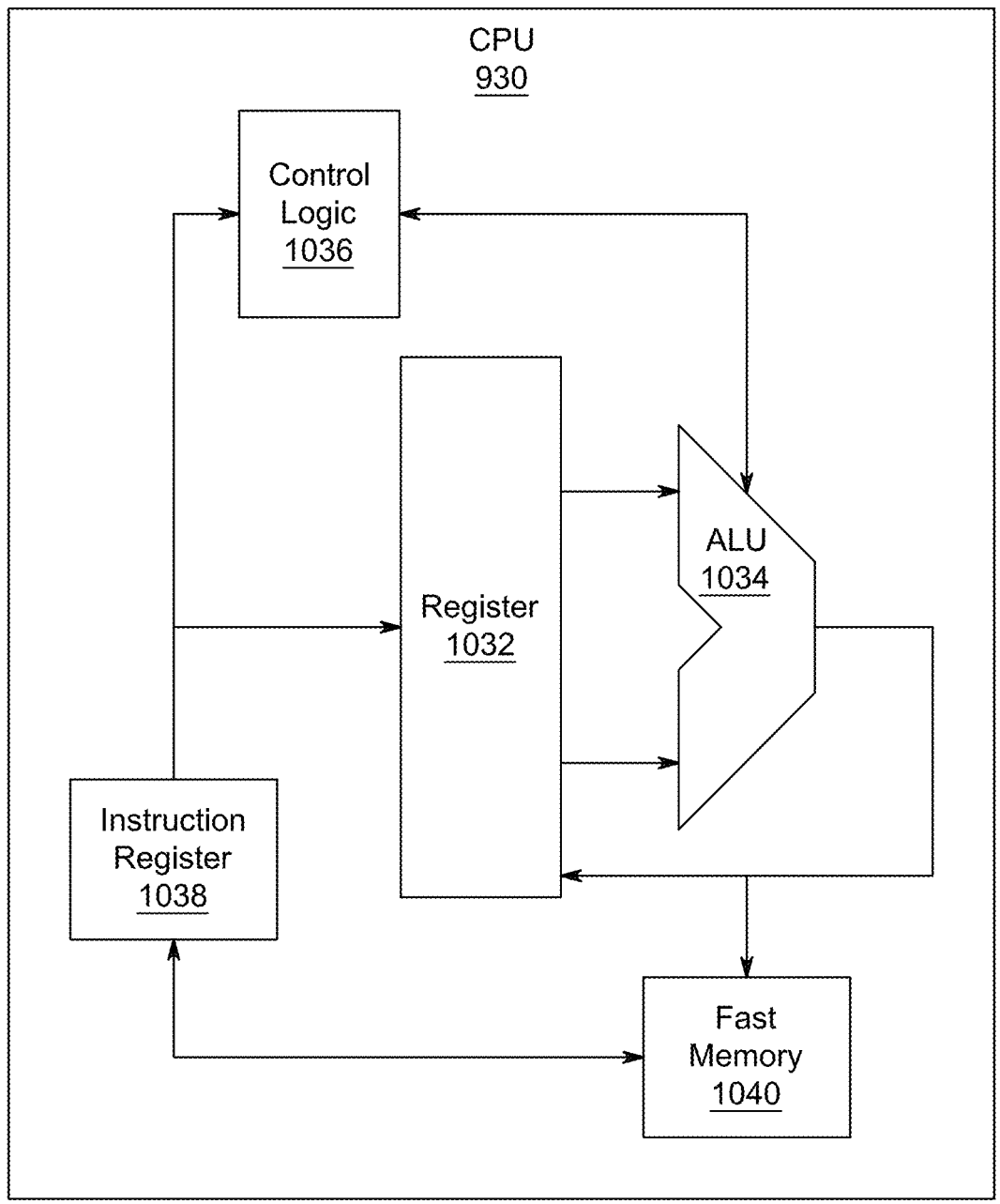
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions is fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 1030 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 856, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
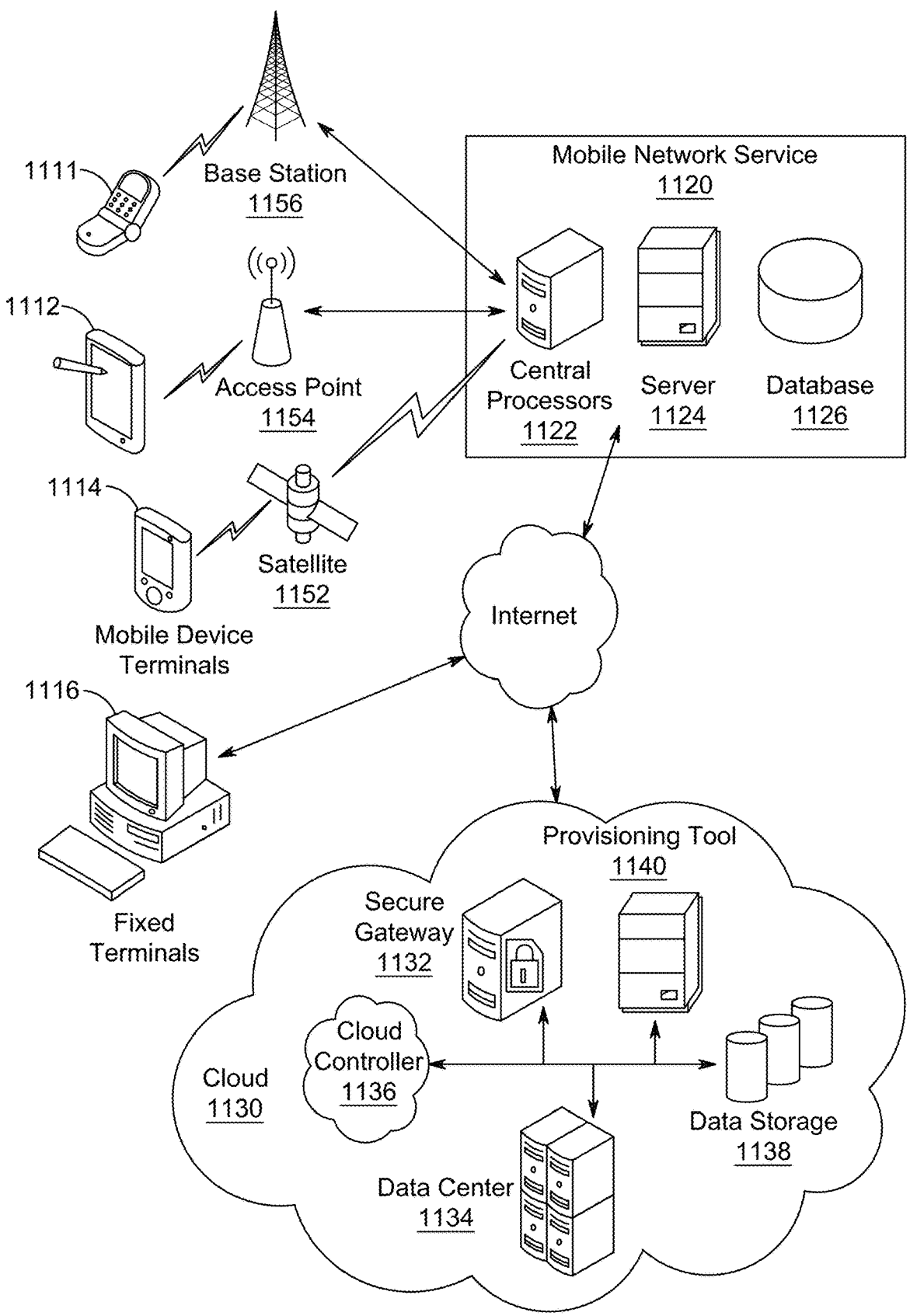
FIG. 11 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 11 illustrates client devices including smart phone 1111, tablet 1112, mobile device terminal 1114 and fixed terminals 1116. These client devices may be commutatively coupled with a mobile network service 1120 via base station 1156, access point 1154, satellite 1152 or via an internet connection. Mobile network service 1120 may comprise central processors 1122, server 1124 and database 1126. Fixed terminals 1116 and mobile network service 1120 may be commutatively coupled via an internet connection to functions in cloud 1130 that may comprise security gateway 1132, data center 1134, cloud controller 1136, data storage 1138 and provisioning tool 1140.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A device for automatic detection of ritual travel, comprising:
   processing circuitry configured to:
   determine a relative location and an angle of travel of a user device relative to a central landmark, a first endpoint, and a second endpoint;
   detect an initial lap around the central landmark based on the relative location and the angle of travel;
   detect a number of laps taken around the central landmark and a pace of the number of laps;
   detect a route of travel between the first endpoint and the second endpoint; and
   provide instructions for completion of ritual travel based on the number of laps taken around the central landmark and the route of travel between the first endpoint and the second endpoint.

2. The device of claim 1, wherein the processing circuitry is further configured to determine the relative location and the angle of travel based on sensor data.

3. The device of claim 2, wherein the processing circuitry is configured to receive the sensor data from the user device via a data communication network.

4. The device of claim 2, wherein the processing circuitry is further configured to transform the sensor data to at least one coordinate system, wherein the at least one coordinate system is a global coordinate system.

5. The device of claim 1, wherein the processing circuitry is further configured to use machine learning to detect the number of laps taken around the central landmark and/or the route of travel between the first endpoint and the second endpoint.

6. The device of claim 1, wherein the processing circuitry is further configured to detect and count a plurality of routes between the first endpoint and the second endpoint, wherein each of the plurality of routes traverses a different path.

7. The device of claim 6, wherein the processing circuitry is further configured to determine an optimal route between the first endpoint and the second endpoint based on the plurality of routes.

8. The device of claim 1, wherein the processing circuitry is further configured to provide customized directions for crowd reduction based on the relative location.

9. A method for automatic detection of ritual travel using a device, comprising:
   determining a relative location and an angle of travel of a user device relative to a central landmark, a first endpoint, and a second endpoint using sensor data;

detecting an initial lap around the central landmark based on the relative location and the angle of travel;

detecting a number of laps taken around the central landmark and a pace of the number of laps;

detecting a route of travel between the first endpoint and the second endpoint; and providing instructions for completion of ritual travel based on the number of laps taken around the central landmark and the route of travel between the first endpoint and the second endpoint.

10. The method of claim 9, further comprising wearing a garment, wherein the garment includes components of the user device embedded or integrated therein, and connecting the garment to the device, wherein the device receives data over a communication network from a textile antenna integrated into the garment.

11. The method of claim 9, further comprising using machine learning to detect the number of laps taken around the central landmark and/or the route of travel between the first endpoint and the second endpoint.

12. The method of claim 9, further comprising transforming the sensor data to at least one coordinate system, wherein the at least one coordinate system is a global coordinate system.

13. The method of claim 9, further comprising detecting and counting a plurality of routes between the first endpoint and the second endpoint wherein each of the plurality of routes traverses a different path.

14. The method of claim 9, further comprising providing customized directions for crowd reduction based on the relative location.

15. A non-transitory computer-readable storage medium for storing computer-readable instructions that, when executed by a computer, cause the computer to perform a method, the method comprising:

determining a relative location and an angle of travel of a user device relative to a central landmark, a first endpoint, and a second endpoint using sensor data;

detecting an initial lap around the central landmark based on the relative location and the angle of travel;

detecting a number of laps taken around the central landmark and a pace of the number of laps;

detecting a route of travel between the first endpoint and the second endpoint; and providing instructions for completion of ritual travel based on the number of laps taken around the central landmark and the route of travel between the first endpoint and the second endpoint.

16. The non-transitory computer-readable storage medium of claim 15, the method further comprising using machine learning to detect the number of laps taken around the central landmark and/or the route of travel between the first endpoint and the second endpoint.

17. The non-transitory computer-readable storage medium of claim 15, the method further comprising transforming the sensor data to at least one coordinate system, wherein the at least one coordinate system is a global coordinate system.

18. The non-transitory computer-readable storage medium of claim 15, the method further comprising detecting and counting a plurality of routes between the first endpoint and the second endpoint wherein each of the plurality of routes traverses a different path.

19. The non-transitory computer-readable storage medium of claim 18, the method further comprising determining an optimal route between the first endpoint and the second endpoint.

20. The non-transitory computer-readable storage medium of claim 15, the method further comprising providing customized directions for crowd reduction based on the relative location.

\* \* \* \* \*